United States Patent Office 3,265,968
Patented August 9, 1966

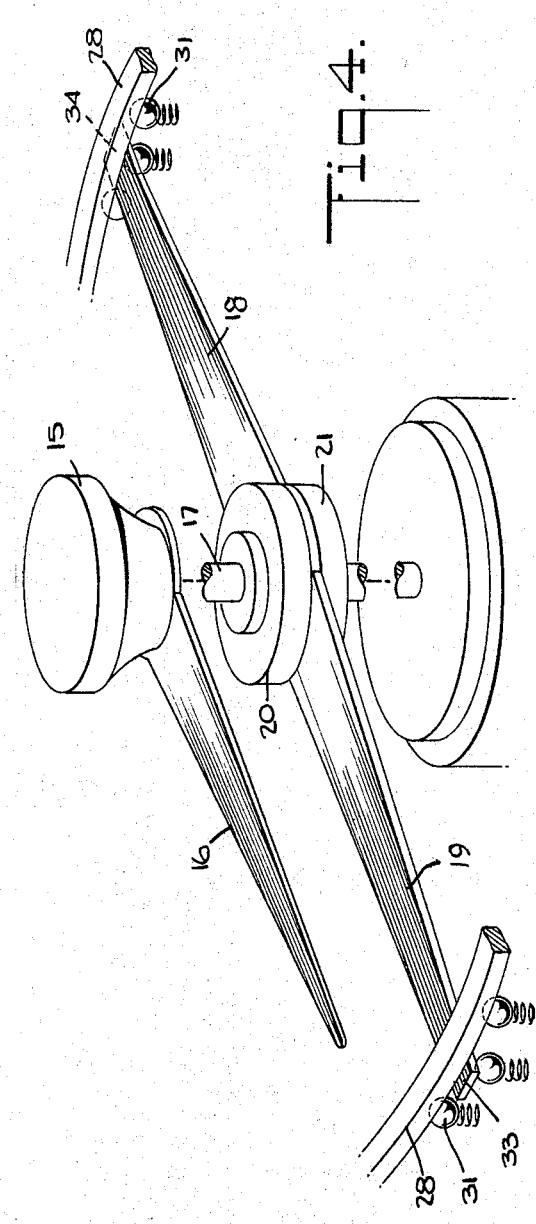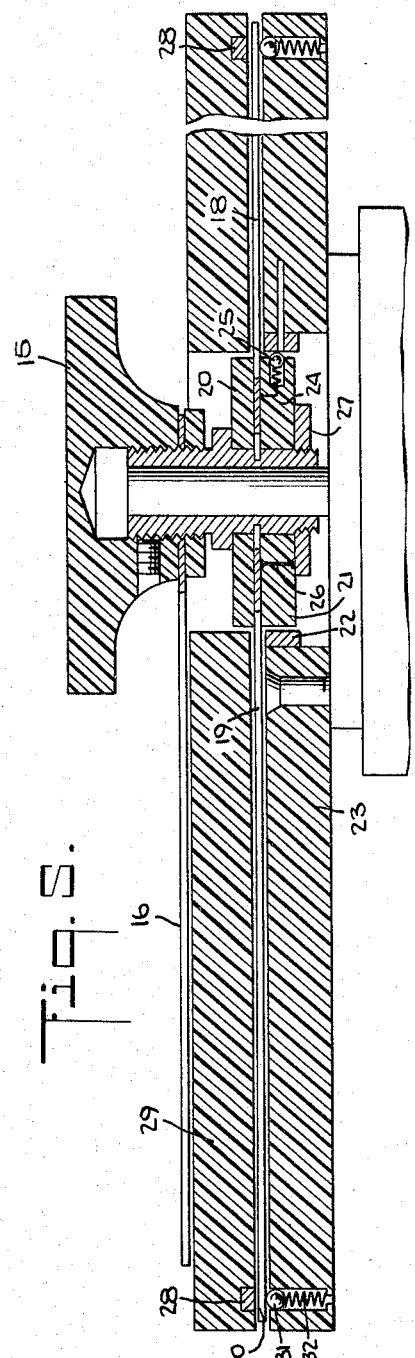

3,265,968
AUTOMATIC APPARATUS FOR CHECKING MULTICONDUCTOR ELECTRICAL CABLES
Alvin V. Bilodeau, Ledyard, Robert J. Francoeur, Waterford, and Robert F. Stein, Groton, Conn., assignors to General Dynamics Corporation, New York, N.Y., a corporation of Delaware
Filed May 4, 1962, Ser. No. 192,545
10 Claims. (Cl. 324—66)

This invention relates to apparatus for checking electrical circuitry and more particularly to automatic apparatus for checking the wiring and electrical characteristics of multi-conductor electrical cables and the like.

At the present time numerous electronic devices require the use of multiconductor electrical cables for interconnecting the various components of a given installation. In a given cable there can be as many as a hundred or more individual electrical conductors which are connected at their ends to plugs and receptacles, each conductor by necessity having a given specific connector to which it is supposed to be joined. After a given cable of such complexity is assembled, it is necessary to make various electrical checks to determine that the cable is properly assembled. It must be determined or confirmed that each conductor is joined to its allotted connector at each end, that good electrical conductivity is provided through each conductor, that there are no short circuits between conductors, and that there are no shorts between the conductors and ground.

Prior art methods to make the above electrical checks require tedious and time consuming manual operations which are subject to human error. Certain prior automatic or semi-automatic equipment has been devised heretofore to perform these functions but for one reason or another they have been found to be unsatisfactory. In addition, they are rather cumbersome, involve complex circuitry, have rather involved methods of operation, and are extremely difficult to calibrate and repair in the field.

Briefly the present invention involves a circuit tester which utilizes a rotary switch means including a conductive ring having a plurality of spring loaded ball contact members disposed around the underside thereof and spring biased normally into contact with the under surface of the ring. A pair of oppositely extending wiper arms are mounted at the center of the ring to rotate as a unit and move between successive individual diametrically opposed contact members and the ring to isolate them electrically from the ring. A stepper motor actuates the arms to rotate them stepwise to successive contact members around the ring. Means are provided for interconnecting the contact members electrically with respective conductors of an electrical cable at one end thereof. Sensing means are provided for sensing pre-selectable resistances and selector means are interposed between the rotary switch means and the sensing means for interconnecting the wiper arms with the sensing circuit. The sensing means comprises relay means and a two-stage amplifier means which includes a cathode follower directly coupled to a second amplifier stage, the input of the cathode follower being connectable through contacts of the relay means to the selector means, and the output of the second stage of the amplifier means being interconnectable by the selector means in series with the coil circuit of the relay means. The sensing means is operable upon sensing a preselected resistance to stop the drive means and the indicator means is operable by the relay means when the amplifier output is opened by the relay means.

In checking line to line characteristics of a given multi-conductor cable, i.e. checking each conductor to make certain that it is not shorted to any of the other conductors in the cable, and in checking line to ground, i.e. each conductor with respect to ground, the two-stage amplifier circuit is employed and it is appropriately biased to cause the relay to drop out upon sensing a resistance of two megohms or less. In checking each conductor for continuity, only the relay itself is used in the sensing circuit, the amplifier circuit being cut out, and it is possible with this apparatus to check each single conductor for continuity and in addition to check the cable to make certain that one or more conductors are not reversed in the assembly.

In addition, a trouble shooting circuit is provided which includes a buzzer which provides an audible signal to permit one man to check a cable assembly which otherwise would require two or more men to do the job.

An object of the present invention is to provide automatic electrical circuit checking apparatus which is fully automatic and may be used to evaluate any electrical cable either before or after installation.

Other objects include the provision of apparatus which is compact, portable, and of relatively low cost to manufacture; apparatus which is capable of automatically checking line to line faults in 196 conductor cables; and apparatus which will automatically evaluate a 196 conductor cable in 6 minutes with respect to continuity, line to line and line to ground. Other objects and features will become apparent from the following description and claims, and in the drawings, in which:

FIG. 4 is an exploded partial isometric view of the wiper arms and related parts of the rotary switch; and FIG. 5 is a fragmentary vertical section through the rotary switch.

Figure 1:
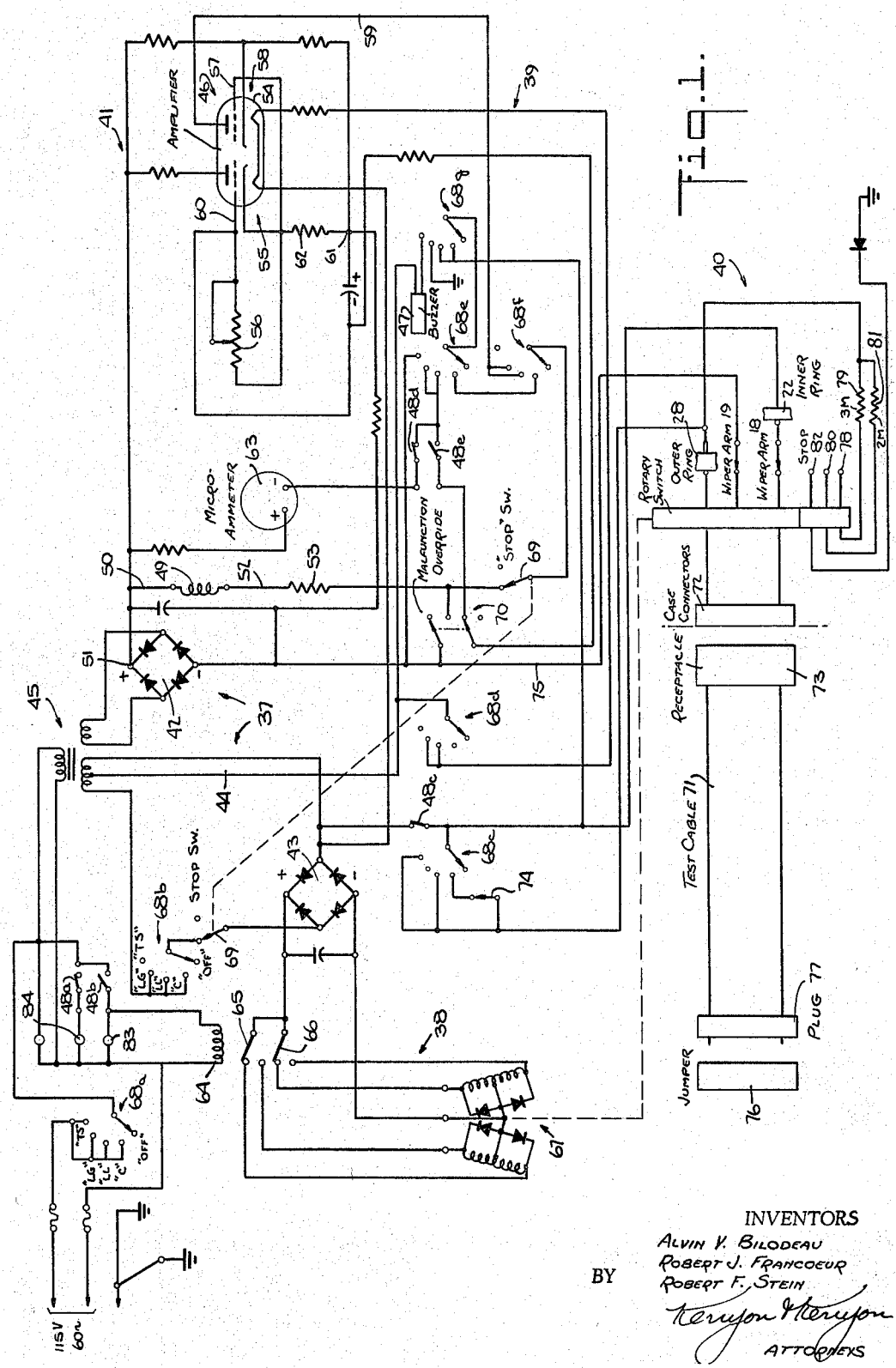
FIG. 1 is a schematic diagram of the electrical circuit involved in one embodiment of the present invention.
Figure 2:
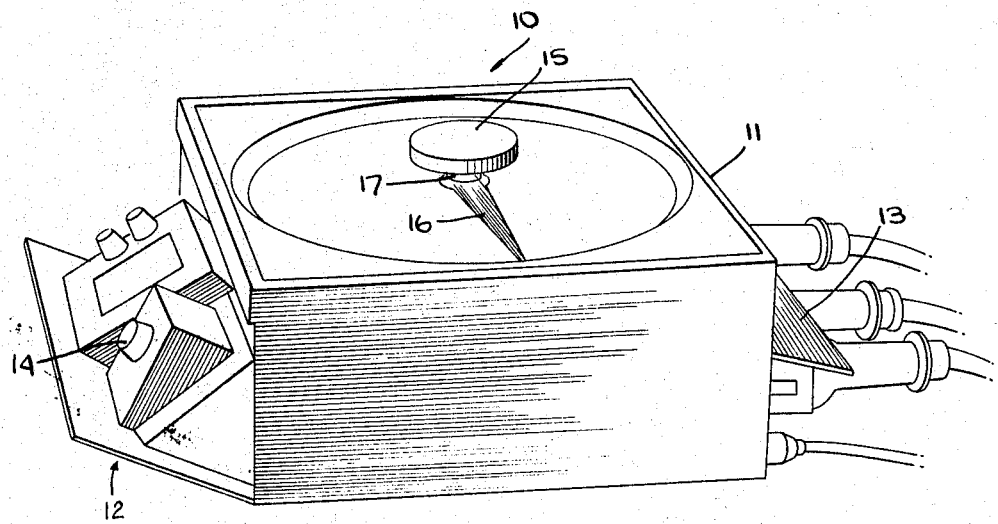
FIG. 2 is a reduced isometric view of the circuit tester of the present invention.
Figure 3:
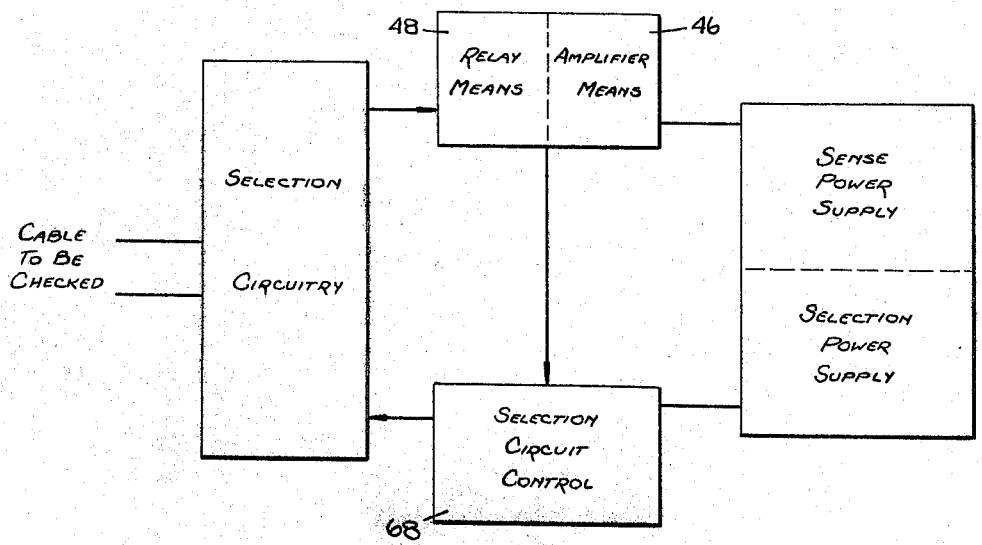
FIG. 3 is a block diagram of the apparatus.

Referring now to the drawings, and in particular FIGS. 2, 3, 4 and 5, the tester unit is designated generally by the reference numeral 10. It consists of a portable case 11 weighing approximately thirty-five pounds, and having front and back hinged panels 12, 13 respectively which open up and at the front present the necessary controls for the operating unit such as the selector switch 14 and the other controls to be described hereinafter, while the back panel opens up to permit interconnection of the tester unit 10 with the necessary power cable and connections for the cable tester.

On the top of the unit is a manual control knob 15 and pointer 16 which are affixed to shaft 17 carrying wiper arms 18 and 19, all of which are connected to rotate as a unit with shaft 17. Wiper arms 18 and 19 are affixed to shaft 17 by any suitable insulating means such as collars 20, 21 which isolate the wiper arms electrically from shaft or spindle 17. Wiper arm 18 is electrically connected to inner conductive ring 22, affixed to the lower nonconductive base 23 of the tester unit by jumper 24 or other suitable means which interconnects wiper arm 18 with spring biased ball contact 25 which bears against inner ring 22.

Likewise wiper arm 19 is electrically connected by a suitable jumper 26 to metal washer 27 which retains collars 20, 21 on spindle 17. Electrical connections from the other circuitry to be described hereinafter are made to wiper arm 18 through inner ring 22 and to wiper arm 19 through metal washer 27.

Wiper arms 18, 19 are oppositely disposed with respect to one another and extend radially outwardly to underlie outer conductive ring 28 which is embedded and slightly recessed in the upper nonconductive portion 29 of the tester unit 10. The wiper arms 18, 19 do not make electrical contact with outer ring 28. Arranged along the underside 30 of ring 28 are a plurality, e.g. two hundred ball contact members 31 which are biased by conductive springs 32 into contact with the underside 30 of ring 28. The outer end portions 33, 34 of wipers 18, 19 are dimensioned so that they can be swung into an interposed relation between individual ball contacts 31 and ring 28 to isolate the individual ball contacts from the ring 28.

By use of a suitable timer assembly and stepper motor (hereinafter described the wiper arms may be advanced stepwise to force diametrically opposed ball contacts one at a time (per wiper arm) away from the outer conductive ring and thereby isolate a pair of ball contacts and their respective associated circuits from all of the remaining ball contacts and their associated circuits, the latter being thereby shorted together electrically. As the wiper arms are advanced to the next successive position, the springs 32 force the balls 31 of the immediate previously isolated balls upward to again make contact with the outer shorting ring 28. If deemed necessary, the configuration of the outer ends 33, 34 of wiper arms 18, 19 can be made such that "make before break" action occurs as the arms move from a given position to the next.

Referring now to FIG. 1, the electrical circuitry of the tester is shown and it comprises generally a power supply section 37, a programming and drive section 38, an operating control section 39, a selection and check section 40, and a sensing section 41.

The power supply section 37 operates on a 115 volt 60 cycle single phase supply voltage and converts this to 200 volts D.C. at full wave rectifier 42 and to 26 volts D.C. at full wave rectifier 43 and 15 volts A.C. by secondary tap 44 at input power transformer 45. The high voltage D.C. supplies the sensing section 41, the low voltage D.C. provides the energizing voltage for the programming and drive section 38, and the low voltage A.C. provides heater voltage for the amplifier 46 as well as energizing voltage for buzzer 47 which is utilized in the trouble shooting mode.

The sensing section 41 has as its main actuating mechanism relay 48 having its energizing coil 49 connected at one end 50 to the positive side 51 of the high voltage D.C. rectifier 42. The other end 52 of relay coil 49 is connected through current limiting resistor 53 to the operating control section 39. The sensing section 41 also includes a two-stage amplifier circuit 46 which is comprised of a 12AT7 double triode 54, the first or input stage 55 thereof being a cathode follower circuit with a negative input and a negative output, the bias thereof being adjustable at potentiometer 56. The output of the cathode follower is directly coupled to the grid 57 of the second stage 58 as shown. The output of the second stage 58, i.e. the plate 59, is connected to the operating control section through which it is interconnected with relay coil 49 in the line to line and line to ground modes. Potentiometer 56 is adjustable so that amplifier input grid 60 becomes more negative with respect to point 61 at the lower side of cathode resistor 62, due to the sensing of a resistance of two megohms or less, thereby creating a negative output from the first stage 55 which is delivered to the grid 57 of the second stage 58 and raises the voltage on plate 59 and thereby decreases the voltage drop across relay coil 49, causing relay 48 to become deenergized, opening relay contact 48b and disabling the programming and drive section 38 which stops the pointer 16 at the particular ball contact 31 where such resistance is sensed. This latter operation of the amplifier circuit occurs in the line to line or line to ground modes as will be explained in greater detail hereinafter.

Microammeter 63 is insertable in the sensing circuit in place of relay coil 49 by closing of relay contact 48d when relay 48 becomes deenergized in the line to line and line to ground modes so that approximation of the resistance sensed may be made.

The programming and drive section 38 comprises a 60 cycle per second synchronous motor (not shown) which is supplied with 115 volt A.C. through relay contact 48b to its armature 64. The motor drives a cam (not shown) at the rate of six r.p.m., the cam, in turn, actuating two double pole double throw switches 65, 66 sixteen times for each revolution. The relative positions of the switches around the cam result in one switch actuation (either off or on) every .5 second. The double pole double throw switch wipers are connected to low voltage full wave D.C. rectifier 43. Due to the inherent characteristics of the stepper motor, the rotary switch wiper arms 18, 19 which are connected directly to the stepper motor shaft 17, will rotate 1.8° with each cam switch actuation. As previously mentioned, the wiper arms 18, 19 are calibrated to step from center to center of each ball contact member 31.

The operating control section 39 has as its main element mode selector switch 68 which is a four-gang, eight pole, five position rotary switch used to select the following modes as indicated: "Off," "C" or continuity, "LL" or line to line, "LG" or line to ground, and "TS" or trouble shooting. The selector switch 68 has seven wafers or decks 68a through g. 68a controls the line voltage, 68b controls the low voltage D.C., 68c controls the interconnection of wiper arm 18 into the sensing circuit, 68d controls application of the heater supply voltage to the filaments of the amplifier circuit, and 68e through g are concerned with interconnection of relay 48 and amplifier 46 into the sensing circuit, as well as many other connections in the sensing circuit.

Momentary double pole double throw toggle switch 69, located on the drop out panel 12, permits manual stopping of the stepper motor by removing the low voltage D.C. supply to the stepper motor field 67, and by removing energizing voltage to the relay coil 49.

A second momentary double pole double throw toggle switch 70, called the Malfunction Override Switch, also located on the drop out panel 12, enables the operator to reset or reenergize relay 48 and consequently the stepper motor circuit to cause the wiper arms 18, 19 to advance to the next ball contact 31 after a stoppage has been caused by the sensing of a fault.

In order to check a test cable 71 in the continuity mode, the latter is connected to the case connectors 72 of the tester unit 10 at its receptacle end 73, which interconnects the respective conductors of the cable with corresponding ball contacts 31 adjacent to outer ring 28. Selector switch 68 (14) is turned to the "C" position which through deck 68a delivers the 115 volt A.C. supply voltage to the power supply section 37 and delivers the 26 volt D.C. operating voltage to the programming and drive section 38 previously described. The outer ring 28 is connected with wiper arm 18 through deck 68c (with sub-mode selector switch 74). Wiper arm 19 is excited from the negative side of the high voltage D.C. power supply 42 through line 75 and a feed-back path is provided through jumper connector 76 which is connected to plug 77 or outer end of test cable 71 which shorts all of the conductors of the cable together at the outer end and thereby interconnects the outer ring 28 with wiper arm 18 through the harness being checked.

Coil 49 of relay 48 is connected at its one end 50 to the positive side 51 of the high voltage D.C. power supply 42 and at its other end 52 through manual stop switch 69, selector switch decks 68f, 68e, 68g, and 68c, the outer ring 28 through cable 71, through jumper connector 76, back through cable 71, through wiper arm 19 to the negative side of the high voltage D.C. through line 75. For this particular mode and sub-mode the outer ring 28 and wiper arm 18 are interconnected to one another through selector switch deck 68c and sub-mode selector switch 74.

If wiper arm 19 encounters an open or high resistance line this will cause the negative side of the high voltage D.C. power supply to be disconnected from the return path and relay 48 is deenergized thereby opening contact 48b, deenergizing programming and drive section 38 and locking the stepper motor at that particular position sensed. This particular sub-mode of the continuity mode is used for previously checked cables or systems in which the absence of line reversal is presumed, but line continuity is being investigated.

Where, on the other hand, the cable or system is being checked for the first time, and line reversal is a possibility, the "two-arm" circuit is employed which involves opening sub-mode selector switch 74 and further requires use of a jumper connector 76 in which the lines diametrically opposed to one another (or some other selected arrangement) at the circuit checker are shorted to one another respectively. Sensing is accomplished once again between wiper arm 19 and wiper arm 18. In this particular case when an open line is indicated, the possibility exists that one of the two leads is open. The identification of the particular lead is ascertained upon subsequent checking, either by use of the trouble shooting mode (explained hereinafter) or by standard line checking procedures.

It is to be noted that in either of the continuity sub-modes, the amplifier stage 46 is not utilized.

In making a line to line check, the selector switch 68 is moved to the "LL" position which interconnects the coil 49 of relay 48 through deck 68f to the plate 59 of the second stage 58 of amplifier 46. Similarly, wiper arm 18 is connected through deck 68c to the outer ring 28. Wiper arm 19 is connected to the negative side of the high voltage D.C. power supply through line 75 and thus senses between itself and the outer ring 28. When wiper arm 19 senses a resistance between any selected line and the outer ring 28 which is of a predetermined value, e.g. two megohms or less, amplifier input 60 becomes more negative with respect to point 61 as previously described and relay 48 drops out. Once again this locks the stepper motor at the particular ball contact. In this particular mode, when relay 48 drops out, microammeter 63 is connected in series with the line to line resistance through relay contact 48d and selector switch decks 68e and 68g, providing a relative indication of the magnitude of the resistance sensed.

In checking the line to ground mode the selector switch 68 is moved to position "LG" which maintains the amplifier circuit 46 connected to the sensing means. Relay 48 is again interconnected to manual stop switch 69 and selector switch deck 68f to the plate 59 of the second amplifier stage 58. Wiper arm 18 is out of the sensing circuit in this mode, as is the outer ring 28. Sensing is between wiper arm 19 and the ground connection maintained on input 60 through selector switch decks 68e and 68g. When wiper arm 19 encounters a resistance of a line to the selected ground of a predetermined value, e.g. two megohms or less, then by similar actuation of the amplifier circuit the relay 48 is deenergized. Insertion of the microammeter 63 in the circuit at this point enables a relatively precise determination of the resistance sensed.

Each of the three main modes previously described have different "stop" positions at the end of the sensing cycle. The continuity mode has a stop position 78 at which resistor 79 of three megohms is connected between wiper arm 19 and outer ring 28 thereby causing relay 48 to be deenergized in the previously described manner. Ball contact 78 is preferably insulated from outer ring 28, otherwise it may happen that a malfunction in line to line will erroneously give a malfunction in line to ground. In the line to line mode stop position 80 connects a resistor 81 (two megohms) between wiper arm 19 and outer ring 28 likewise stops the mechanism. The line to ground mode has stop position 82 which connects wiper arm 19 to ground and once again stops the mechanism.

Calibration of the unit for line to line and line to ground modes is accomplished by rotating the wiper arm 19 to position 78 and checking for a "go" signal, i.e. contact 48b is closed and "go" light 83 lights up meaning that the mechanism is operative. If a "no-go" signal is obtained, i.e. relay contact 48b is opened and contact 48a is closed, thereby lighting "no-go" light 84, potentiometer 56 is adjusted until a consistent "go" signal is obtained. After this adjustment is made, position 80 should produce a "no-go" and an automatic stop. If necessary potentiometer 56 should be adjusted further to assure positive actuation of relay 48 when sensing two megohms and no actuation when sensing three megohms.

It is to be understood in the arrangement just described that stop positions 78, 80 and 82 are located at the very end of the succession of ball contacts around the outer ring 28, so that automatic stops are provided for each mode after all of the conductors of a cable have been checked and the unit will not continue to cycle beyond that necessary for the checking of the cable.

Operation of the above tester is relatively simple and is easily and quickly accomplished. The unit is assembled with all of the necessary power cable and cable harnesses being connected to the tester and to the test cable. Drop out instrument panel 12 is opened and it is made certain that wiper arm 19 is at the stow position (at the two hundredth or last ball contact around the ring) before starting any mode. Next the selector switch 68 is turned to the "C" or continuity mode. Malfunction override switch 70 is depressed until wiper arm 19 steps to position 1, i.e. the first ball contact 31 adjacent the stow position and then the switch is released. If continuity is present, wiper arms 18, 19 will continue stepping to the end or stop position. If lack of continuity is sensed, the wiper arms will stop on a questionable position. After recording the position at which the pointer 16 indicates, the malfunction override switch 70 is depressed until the arms step to the next position and is then released. If continuity is present in the next position, the wiper arms will continue to step automatically to the end. If no malfunctions are encountered, the mechanism will step automatically to the programmed stop at position 78.

Next the jumper connectors are removed and the selector switch 68 is turned to the "LL" or line to line mode and then it is necessary to wait about thirty seconds for the amplifier to warm up. Then the malfunction override switch 70 is depressed and if no fault (approximately two megohms or less) exists on any position, the wiper arms will step to the end or stop position. If a fault is sensed, the wiper arms will stop and the position number can be recorded as previously. The malfunction override switch 70 is then depressed and kept depressed until the arm steps to the next position and is then released. If no fault is present in the next position the arm will continue to step automatically. Otherwise, the procedure is repeated as outlined above. Similar procedure is followed in the line to ground mode which is achieved with the selector switch 68 at the "LG" position.

With the selector switch 68 turned to the "TS" mode or trouble shooting, the pointer 16 is turned manually by knob 15 to a previously recorded malfunction 15. If the malfunction was recorded in the continuity mode, the open conductor may be isolated by probing with a jumper at successive connectors. When a proper circuit exists, the buzzer 47 will sound. By proper coded tabulation the particular conductor can be ascertained. If the malfunction was recorded in line to line or in line to ground modes, the malfunction may be isolated by successively opening connectors. If the buzzer continues to sound when a connector is broken, the malfunction exists somewhere between that connector and the tester unit 10.

It can thus be seen that the present invention provides a relatively simple and easily operated electrical circuit tester which achieves all of its intended objects and overcomes the disabilities of prior art devices.

It is to be understood that changes and additions can be made to the embodiment described without departing from the spirit and scope of this invention.

We claim:

1. Electrical circuit checking apparatus comprising rotary switch means including a conductive ring, a plurality of contact members in normally closed contact with said conductive ring, a pair of selector arms rotatively mounted at the center of said ring and movable against successive individual contact members to isolate them electrically from said ring, means for interconnecting said contact members with respective conductors of an electrical cable, electrical sensing means for sensing a preselected resistance in the respective conductor connected to each such isolated contact member and for providing electrical switching action upon sensing of such preselected resistances, and selector switch means electrically interconnecting said rotary switch means and said sensing means for selectively interconnecting at least one of said arms electrically with said sensing means and for establishing a predetermined electromechanical utilization for said switching action of said sensing means.

2. Electrical circuit checking apparatus comprising rotary switch means including a conductive ring, a plurality of contact members in normally closed contact therewith, a pair of selector arms rotatively mounted at the center of said ring and movable against successive individual contact members to isolate them electrically from said ring, drive means for automatically moving said arms stepwise to successive contact members around said ring, means for interconnecting said contact members with respective conductors of an electrical cable, electrical sensing and means for sensing a preselected resistance in the respective conductor connected to each such isolated contact member and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means electrically interconnected with said drive means for stopping said drive means by said switching action. from 5 to 20 g. will suffice.

3. Electrical circuit checking apparatus comprising rotary switch means including a conductive ring, a plurality of contact members in normally closed contact therewith, a pair of oppositely extending selector arms rotatively mounted as a unit at the center of said ring and movable against successive individual diametrically opposed contact members to isolate them from said ring, drive means for automatically moving said arms stepwise to successive contact members around said ring, means for interconnecting said contact members with respective conductors of an electrical cable at one end thereof, electrical sensing means for sensing a preselected resistance in the respective conductor connected to each such isolated contact member and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means electrically interconnected with said driven means for stopping said drive means by said switching action, and switch means for interconnecting one of said arms with said ring.

4. Electrical circuit checking apparatus comprising rotary switch means including a conductor ring, a plurality of contact members in normally closed contact therewith, a pair of oppositely extending selector arms rotatively mounted as a unit at the center of said ring and movable against successive individual diametrically opposed contact members to isolate them from said ring, drive means for automatically moving said arms stepwise to successive contact members around said ring, means for interconnecting said contact members with respective conductors of an electrical cable at one end thereof, electrical sensing means for sensing a preselected resistance in the respective conductor connected to each such isolated contact member and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means electrically interconnected with said drive means for stopping said drive means by said switching action, and switch means for interconnecting one of said arms with said ring, and indicator means included with said sensing means and energizable by said switching action upon sensing of said preselected resistance arms with at least one of said points, said sensing means operable upon sensing a preselected resistance to stop said drive means, switch means for interconnecting one of said arms with said ring, and indicator means coupled with said sensing means and selectively operable thereby upon sensing of one of said resistances.

5. Electrical circuit checking apparatus comprising rotary switch means including a conductive ring, a plurality of contact members in normally closed contact therewith, a pair of oppositely extending selector arms rotatively mounted as a unit at the center of said ring and movable against successive individual diametrically opposed contact members to isolate them from said ring, drive means for automatically moving said arms stepwise to successive contact members around said ring, means for interconnecting said contact mebers with respective conductors of an electrical cable at one end thereof, electrical sensing means for sensing a preselected resistance in the respective conductor connected to each such isolated contact members and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means selectrically interconnected with said drive means for stopping said drive means by said switching action, and switch means for interconnecting one of said arms with said ring, and indicator means included with said sensing means and energizable by said switching action upon sensing of said preselected resistance and means for automatically stopping said drive means after a predetermined traverse has been made by said arm.

6. Electrical circuit checking apparatus comprising rotary switch means including a conductive ring, a plurality of contact members in normally closed contact therewith, a pair of oppositely extending selector arms rotatively mounted as a unit at the center of said ring and movable against successive individual diametrically opposed contact members to isolate them from said ring, drive means for automatically moving said arms stepwise to successive contact members around said ring, means for interconnecting said contact members with respective conductors of an electrical cable at one end thereof, electrical sensing means for sensing a preselected resistance in the respective conductor connected to each such isolated contact members and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means electrically interconnected with said drive means for stopping said drive means by said switching action, and switch means for interconnecting one of said arms with said ring, and indicator means included with said sensing means and energizable by said switching action upon sensing of said preselected resistance and calibration means included in said sensing means for adjusting the sensitivity of the sensing means to said resistance means coupled with said sensing means for adjusting its sensitivity to said resistances.

7. The sensing means of claim 2 comprising relay means and a two-stage amplifier means including a cathode follower directly coupled to a second amplifier stage, the input of the cathode follower being connected to said selector means, and the output of the second stage of said amplifier means being interconnectable by said selector means in series with the coil circuit of said relay means, said indicator means operable by said relay means when the amplifier output is opened thereby.

8. The sensing means of claim 4 comprising relay means and a two-stage amplifier means including a cathode follower directly coupled to a second amplifier stage, the input of the cathode follower being connectable through contacts of said relay means to said selector means, and the output of the second stage of said amplifier means being interconnectable by said selector means in series with the coil circuit of said relay means, said indicator means operable by said relay means when the amplifier output is opened thereby.

9. Electrical circuit checking apparatus comprising rotary switch means including a conductive ring, a plurality of spring loaded ball contact members disposed around said ring and biased normally into contact with one face thereof, a pair of oppositely extending wiper arms mounted as a unit at the center of said ring and rotatable between successive individual diametrically opposed contact members and said ring to isolate them from said ring, drive means for automatically rotating said wiper arms stepwise to successive contact members around said ring, means for interconnecting said contact members with respective conductors of an electrical cable at one end thereof, electrical sensing means for sensing a preselected resistance in the respective conductor connected to each such isolated contact member and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means electrically interconnected with said drive means for stopping said drive means by said switching action.

10. Electrical circuit checking apparatus comprising rotary switch means including a conductive ring, a plurality of spring loaded ball contact members disposed around said ring and biased normally into contact with one face thereof, a pair of oppositely extending wiper arms mounted as a unit at the center of said ring and rotatable between successive individual diametrically opposed contact members and said ring to isolate them from said ring, drive means for automatically rotating said wiper arms stepwise to successive contact members around said ring, means for interconnecting said contact members with respective conductors of an electrical cable at one end thereof, electrical sensing means for sensing a preselected resistance in the respective conductor connected to each such isolated contact member and for providing electrical switching action upon sensing of such preselected resistance, and selector switch means electrically interconnecting said rotary switch means and said sensing means for selectively interconnecting at least one of said arms electrically with said sensing means and for establishing a predetermined electromechanical utilization for said switching action of said sensing means, said sensing means electrically interconnected with said drive means for stopping said drive means by said switching action, and switch means for interconnecting one of said arms with said ring.

References Cited by the Examiner
UNITED STATES PATENTS

| | | | |
|---|---|---|---|
| 698,200 | 4/1902 | Hinds | 200—11 |
| 1,018,381 | 2/1912 | Smith | 200—11 |
| 2,622,130 | 12/1952 | Kabell | 324—66 X |
| 2,830,264 | 4/1958 | Wittmann | 324—51 |
| 2,912,648 | 11/1959 | Wales | 324—73 |

WALTER L. CARLSON, *Primary Examiner.*

C. A. S. HAMRICK, W. H. BUCKLER,
*Assistant Examiners.*

UNITED STATES PATENT OFFICE
CERTIFICATE OF CORRECTION

Patent No. 3,265,968                           August 9, 1966

Alvin V. Bilodeau et al.

It is hereby certified that error appears in the above numbered patent requiring correction and that the said Letters Patent should read as corrected below.

Column 3, line 8, for "described" read -- described) --; column 7, line 33, after "sensing" strike out "and"; line 45, strike out "from 5 to 20 g. will suffice."; line 67, for "driven" read -- drive --; column 8, line 38, for "mebers" read -- members --; line 49, for "selectrically" read -- electrically --.

Signed and sealed this 22nd day of August 1967.

(SEAL)
Attest:

ERNEST W. SWIDER                          EDWARD J. BRENNER
Attesting Officer                       Commissioner of Patents